(No Model.)
U. D. SELTZER.
BROILER OR TOASTER.
No. 533,851. Patented Feb. 5, 1895.
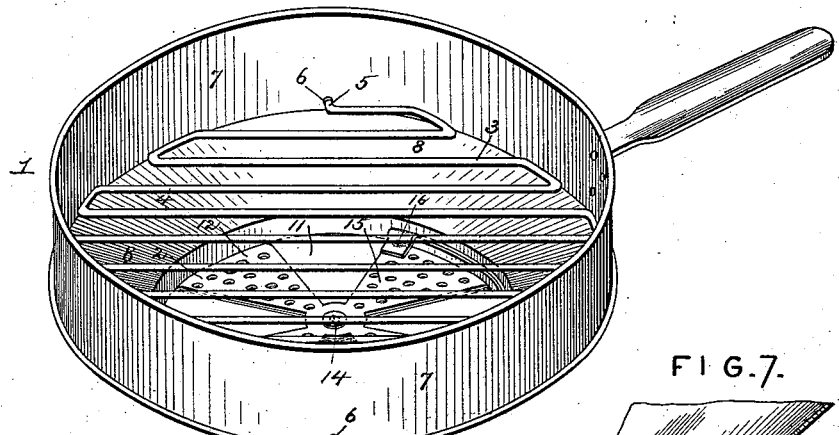
FIG. 1.
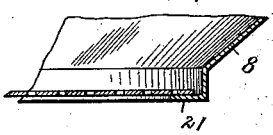
FIG. 7.
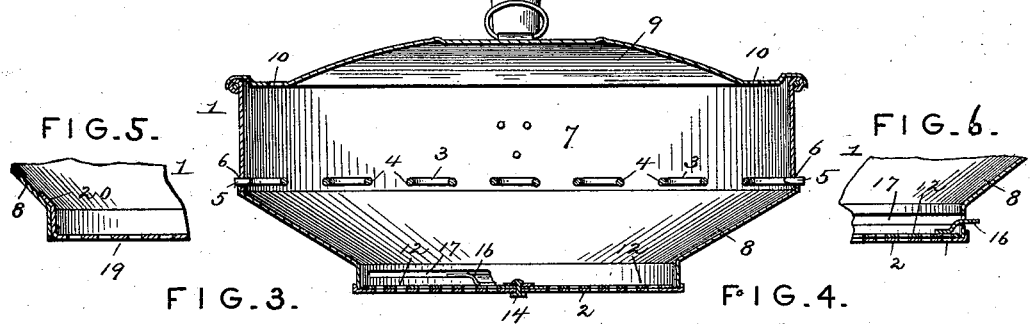
FIG. 2.
FIG. 5.    FIG. 6.
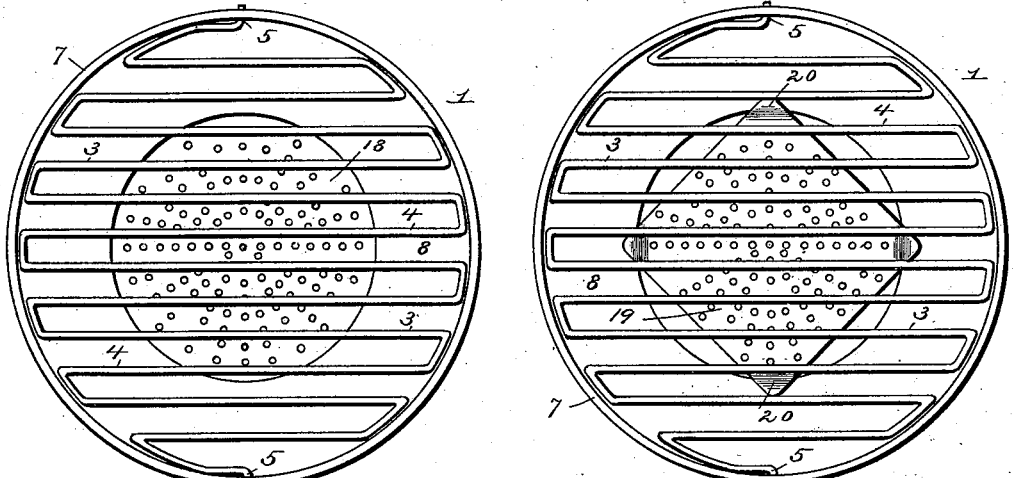
FIG. 3.    FIG. 4.
Witnesses
Harry L. Amer.
N. F. Riley
By his Attorneys.
C. A. Snow & Co.
Inventor:
Uriah D. Seltzer.
THE NORRIS PETERS CO., PHOTO-LITHO., WASHINGTON, D. C.

UNITED STATES PATENT OFFICE.

URIAH D. SELTZER, OF LEBANON, PENNSYLVANIA, ASSIGNOR TO THE SELTZER SPECIALTY COMPANY, OF SAME PLACE.

BROILER OR TOASTER.

SPECIFICATION forming part of Letters Patent No. 533,851, dated February 5, 1895.

Application filed March 9, 1894. Serial No. 503,043. (No model.)

*To all whom it may concern:*

Be it known that I, URIAH D. SELTZER, a citizen of the United States, residing at Lebanon, in the county of Lebanon and State of Pennsylvania, have invented a new and useful Broiler or Toaster, of which the following is a specification.

The invention relates to improvements in broilers and toasters.

The object of the present invention is to improve the construction of broilers and toasters, to cause all the drippings therefrom to run into the fire, to avoid greasing the stove, to prevent smoke from escaping into the room, and to avoid checking the fire.

A further object of the invention is to enable the parts of the broiler and toaster to be readily cleaned.

The invention consists in the construction and novel combination and arrangement of parts hereinafter fully described, illustrated in the accompanying drawings and pointed out in the claims hereto appended.

In the drawings—Figure 1 is a perspective view of a broiler and toaster constructed in accordance with this invention, the cover being removed. Fig. 2 is a transverse sectional view, the bottom being open. Figs. 3 and 4 are plan views showing modifications of the invention. Figs. 5 and 6 are detail sectional views of the perforated bottom. Fig. 7 is a similar view, illustrating another manner of supporting the bottom of the broiler.

Like numerals of reference indicate corresponding parts in all the figures of the drawings.

1 designates a pan or casing, having a perforated or foraminous bottom 2 to cause all the drippings to run into the stove and be consumed by the fire, to avoid greasing the former. Within the body or pan is detachably secured a support or grid 3, constructed of a single piece of resilient wire extending back and forth across the pan or body, forming parallel portions or loops 4 and terminating in outward extending ends or lugs 5, which engage perforations 6 of the pan or body at opposite sides thereof. The pan or body consists of a cylindrical rim 7, the said perforated bottom 2, and an inclined frusto-conical intermediate portion 8 arranged below the support or grid, and sustaining the same. The loops 4 of the wire of the grid are oppositely disposed, and their ends are supported by the inclined portion 8 of the pan or casing.

The particular construction of the support or grid imparts great resiliency to the same; and the support or grid is adapted to be compressed to withdraw the outward extending ends or lugs 5 from the perforations of the pan or body, to enable the grid or support to be cleaned.

During cooking the top or cover 9 prevents smoke from escaping to the room, and it is provided with perforations 10, which create a downward draft to convey the smoke into the stove. The cover or lid also avoids checking the fire while the broiler and toaster is being used for cooking.

The utensil is adapted for broiling, toasting, roasting, steaming, and the like, and in order to enable the heat to be regulated to prevent scorching, or to produce quick cooking, the bottom 2 is provided with radial tapering openings 11, and has pivotally mounted on it a rotating portion 12, composed of tapering arms conforming to the configuration of the openings 11 and adapted to cover the same when it is desired to subdue or modify the heat. The rotating portion operates as a damper or register. The pivot 14 is centrally located; and to facilitate the operation of the adjustable bottom one of the arms 15 is provided with an extension or handle 16 arranged in and projecting outward from a curved slot 17 of the pan or body. The slot 17 is of sufficient length to permit the rotating portion of the bottom to expose and to cover the radial opening.

Instead of constructing the bottom as just described, a permanent bottom 18, as illustrated in Fig. 3 of the accompanying drawings, may be employed; or a removable body 19, as illustrated in Fig. 4 of the accompanying drawings, may be desirable. The removable bottom is provided at intervals with extensions or lips 20, resting upon the intermediate portion 8 of the pan or body and supporting the bottom firmly in position. This latter construction permits the bottom to be readily removed from the pan or body for cleaning.

The pan or body having the removable bottom is especially adapted for steaming, and may be arranged over a kettle or other vessel containing hot water.

Instead of supporting the circular perforated bottom by permanently securing it to the pan or casing, it may be loosely arranged on an inward extending annular flange 21, thereby enabling the bottom to be readily removed when desired.

It will be seen that the utensil is simple and comparatively inexpensive in construction, that it is adapted for broiling, toasting, roasting, steaming, and the like, and that the parts thereof may be readily cleaned. It will also be apparent that the grease or drippings are prevented from getting on the stove, that the smoke is confined and conveyed into the stove and not allowed to escape into the room, and that it avoids checking a fire.

Changes in the form, proportion and the minor details of construction may be resorted to without departing from the principle or sacrificing any of the advantages of this invention.

What I claim is—

1. A pan or body provided with a resilient grid or support constructed of a single piece of resilient wire and consisting of a series of parallel portions extending back and forth across the pan or body, said grid or support having the ends of the wire terminating at opposite sides of the pan or body and engaging the same, substantially as described.

2. A broiler and toaster comprising a pan or body having a perforated bottom and provided with an inclined portion, and the resilient compressible grid constructed of wire, and consisting of loop portions resting upon and supported by the inclined portion of the pan or casing, said grid detachably engaging and interlocked with the pan or casing at opposite sides thereof, substantially as described.

3. A pan or body provided with a resilient compressible grid constructed of wire, and consisting of a series of loops and detachably engaging the pan or body, whereby it is removable therefrom, substantially as described.

In testimony that I claim the foregoing as my own I have hereto affixed my signature in the presence of two witnesses.

URIAH D. SELTZER.

Witnesses:
JNO. H. FISHER,
THOMAS J. SHAAK.